United States Patent [19]
Grant et al.

[11] Patent Number: 4,740,552
[45] Date of Patent: Apr. 26, 1988

[54] ALLOYS OF STYRENIC RESINS AND POLYAMIDES

[75] Inventors: Thomas S. Grant, Vienna; David V. Howe, Parkersburg, both of W. Va.

[73] Assignee: Borg-Warner Chemicals, Inc., Parkersburg, W. Va.

[21] Appl. No.: 829,265

[22] Filed: Feb. 14, 1986

[51] Int. Cl.[4] .............................................. C08L 77/00
[52] U.S. Cl. ...................................... 525/66; 525/183
[58] Field of Search ................................. 525/183, 66

[56] References Cited

U.S. PATENT DOCUMENTS

| | | | |
|---|---|---|---|
| 3,134,746 | 5/1964 | Grabowski | 260/45.5 |
| 3,668,274 | 6/1972 | Owens et al. | 260/857 G |
| 3,868,433 | 2/1975 | Bartz et al. | 260/876 R |
| 4,198,327 | 4/1980 | Matsumoto et al. | 260/4 |
| 4,230,830 | 10/1980 | Tanny et al. | 525/222 |
| 4,496,690 | 1/1985 | Grant et al. | 525/66 |
| 4,528,326 | 7/1985 | Dean | 525/66 |

FOREIGN PATENT DOCUMENTS

| | | | |
|---|---|---|---|
| 0079059 | 5/1985 | Japan | 525/66 |
| 0086162 | 5/1985 | Japan | 525/66 |

*Primary Examiner*—John C. Bleutge
*Assistant Examiner*—A. Carrillo
*Attorney, Agent, or Firm*—Richard J. Schlott; Emily A. Richeson

[57] ABSTRACT

An improved method for making alloys of styrenic resins and polyamides. The styrenic resin is first melt-processed with an ethylenically-unsaturated carboxylic compound, optionally in the presence of a free-radical generator, then combined with the polyamide under melt-processing conditions. The compositions remain thermally-processable and generally exhibit good impact properties with little or no delamination.

11 Claims, No Drawings

ALLOYS OF STYRENIC RESINS AND POLYAMIDES

BACKGROUND OF THE INVENTION

The present invention relates to alloys of synthetic resins and more particularly to alloys of modified styrenic resins with polyamides and to an improved method for the preparation of alloys of styrenic resins with polyamides.

Hydrocarbon polymers such as polystyrene and the copolymers and graft polymers of styrene with acrylic esters, acrylonitriles and the like are generally incompatible or at best are only poorly compatible with dissimilar materials such as aliphatic and aromatic polyamides, widely termed nylon resins. Blends of certain nylon resins with some styrenic resins are known in the art, such as the blends of epsilon caprolactam polymers with acrylonitrile—styrene—butadiene (ABS) graft polymers exemplified in U.S. Pat. No. 3,134,746. Even though these known prior art blends exhibit many useful properties, lack of good compatibility between the polyamide and ABS often results in multi-phase or layered structures that exhibit poor interphase adhesion, with a concomitant tendency toward brittleness and delamination.

U.S. Pat. No. 3,668,274 discloses a method for preparing alloys of nylon resins and a multistage modifier resin consisting of a graft copolymer having an amine-reactive moiety copolymerized in the graft phase. The amine-reactive moiety, such as a copolymerizable carboxylic acid, is said to react with the amine end-groups of the nylon component to form covalent bonds between the nylon and graft copolymer components. These alloys are said not to exhibit phase separation during processing. More recently, in U.S. Pat. No. 4,496,690, the modification of styrenic resins to include an ethylenically-unsaturated carbonamide co-monomer is disclosed as reducing the tendency toward delamination in blends with nylons.

The presently available methods for combining styrenic resins and polyamides into alloys thus appear to be limited to use with specific styrenic copolymer resins or analogously modified polyamide resins. Preparing these specialty resins generally requires additional process steps, incurring increased costs and adding complexity to the manufacturing process. A method for the direct preparation of such alloys from commercially available, conventional styrenic resins and polyamides would greatly increase the number of resins that could be used in preparing such blends and lead to a wider variety of useful alloys. Such a process could be practiced either by the resin producer or by the resin compounder, and thus find wide application. Additionally, the over-all costs of producing such alloys could be reduced by eliminating the need for specialty styrenic resins, thereby benefiting the resin producer and the resin consumer.

SUMMARY OF THE INVENTION

This invention relates to alloys of styrenic polymers and polyamides. More particularly, the invention relates an improved method for making alloys of styrenic resins and nylons, the improvement being the direct carboxylation of a conventional styrenic resin by melt-blending the styrenic resin component with a minor amount of an ethylenically-unsaturated carboxylic compound prior to forming the alloy. The improved method of this invention employs conventional styrenic resins and polyamides and provides alloys exhibiting a reduced tendency to delaminate during melt processing. The alloys have surprisingly high impact properties as well as improved tensile strength and high load heat distortion properties compared with mere blends of nylon with conventional styrenic resins.

DETAILED DESCRIPTION

The nylon resins useful for the purposes of this invention are the conventional injection-moldable polyamide resins known widely as nylon resins, including both aliphatic polylactams such as polycaprolactam (Nylon 6) and higher analogs such as Nylon 11 and Nylon 12, and polyamides formed from aliphatic diamines and aliphatic dicarboxylic acids such as polyhexamethylene sebacamide (Nylon 6,10), polyhexamethylene adipamide (Nylon 6,6) and the like. Further examples of useful polyamides include the amorphous as well as the crystalline versions, the toughened polyamides, and the aromatic-aliphatic copolymers, terpolymers and tetrapolymers. A great variety of these nylon resins are well-known and widely available commercially.

The styrenic polymers which may be usefully carboxylated for the purposes of this invention are polymers and copolymers of styrene. The preferred resins are those commonly designated as impact-modified styrenic resins. Impact-modified styrenic resins are generally prepared by the graft polymerization of mixtures of styrene and optionally one or more additional copolymerizable vinyl monomers in the presence of a rubbery polymeric substrate. Analogous resins may also be produced by blending a rigid styrenic polymer matrix with a rubbery graft copolymer substrate. Comonomers which may be employed in mixtures with styrene for the preparation of rigid copolymers as well as for use as grafting monomers include the substituted styrenes such as alpha methylstyrene, halostyrenes, and alkyl styrenes or vinyl alkylbenzenes like vinyl toluene, vinylxylene, butylstyrene and the like, nitrile monomers such as acrylonitrile and methacrylonitrile, and acrylate monomers such as the lower alkyl ester of methacrylic acid and mixtures thereof. The rubbery polymeric substrate portion will comprise from 5 to 80%, preferably from 5 to 50% of the total weight of the graft polymer and will include rubbery polymers selected from the group consisting of polybutadiene, polyisoprene, rubbery styrene-diene copolymers containing up to 50 wt% styrene, acrylic rubber, nitrile rubber and olefin rubbers such as EPDM and EPR. Specific examples of graft polymers which may be usefully carboxylated for the purpose of this invention are the acrylonitrile-butadiene-styrene graft polymer resins (ABS), methylmethacrylate-butadiene-acrylonitrile-styrene (MABS) resins and the like.

For use in preparing the alloys according to the practice of this invention, the styrenic resin is compounded with an ethylenically-unsaturated compound containing a carboxylic group, e.g., a carboxylic acid, anhydride or amide group, in a melt-blending process. Representative of such unsaturated carboxylic compounds are maleic anhydride, glutonic anhydride, itaconic anhydride, citraconic anhydride, tetrahydrophthalic anhydride and the like, as well as the carboxylic acid, amide and imide analogs thereof, i.e. maleic acid, fumaric acid, maleimide, itaconic acid and the like. The most effect unsaturated carboxylic compounds are those wherein the ethylenic unsaturation is conjugated with a carboxyl group e.g., the α,β-unsaturated carboxylic anhydrides. Nonconjugated unsaturated anhydrides such as Δ-4 tetrahydrophthalic anhydride may also be employed, however these are not preferred. The compounds useful for the purposes of this invention may be more broadly characterized as having both a reactive carbon-carbon ethylenic double bond and a reactive carboxylic functional group.

The carboxylic compound will be employed at very low levels, and normally will comprise from 0.05 to 15 parts by weight (pbw) and more preferably from 0.1 to about 10 pbw per hundred parts by weight of styrenic resin. The level employed will depend in part upon the particular unsaturated carboxylic compound employed, and the optimum level for most purposes will lie in the range from about 0.1 to about 5 pbw for most applications. At levels below about 0.05 pbw, little or no improvement will be observed, while at levels much above about 10 pbw for most of the unsaturated carboxylic compounds the overall properties of the styrenic resin component begin to be affected detrimentally.

The styrenic resin is carboxylated in a melt-blending step, wherein the styrenic resin and the carboxylic compound are melt-processed using any of the conventional melt processing techniques such as, for example, Banbury mixing, milling and extrusion. Most conveniently, the mixture of the styrenic resin and the carboxylic compound are melt-mixed at a temperature in the range of from 450°-650° F., using a compounding extruder. Optionally, from about 0.01 to about 2.0 pbw of a free-radical generator such as a peroxide or perazo compound may also be included. Representative of suitable free-radical generators are dicumyl peroxide, benzoyl peroxide, cumene hydroperoxide, azobisisobutyronitrile and the like.

The carboxylated styrenic polymers, when melt-mixed with nylons, form alloys rather than simple polymer mixtures or blends. These alloys exhibit unexpectedly great improvement in impact properties as compared with equivalent blends of unmodified styrenic polymers with nylons. These alloys, which may comprise from 5 to 95 wt% carboxylated styrenic polymer and correspondingly from 95 to 5 wt% polyamide, are readily processable thermoplastic compositions which exhibit no significant delamination upon extrusion or molding. These characteristics demonstrate that the compositions of this invention are not highly-cross-linked, and yet exhibit processing characteristics of compatible mixtures.

The alloys are formed by melt-blending the carboxylated styrenic polymers with the polyamide using any of the conventional melt processing techniques such as, for example, Banbury mixing, milling and extrusion. Most conveniently, the alloys will be formed by first mixing the dried resins in powder, flake or similar dry solid form, then melt processing the resulting dry blend. Equally useful for most purposes will be the fluxing of the resins in a Banbury mixer to provide an homogeneous mass which then may be sheeted-out on a mill and chopped to form a particulate material for extrusion or injection molding. Alternatively, the alloys may be formed by first preparing the carboxylated styrenic resin component in a compounding extruder, and feeding the product directly to a second compounding extruder, together with the solid polyamide, to accomplish the final melt processing step. Such mixing processes are conventionally employed in the plastics converting art, as are various further modifications that will be apparent to those skilled in the art.

The alloys of this invention are useful thermoplastics, and may further include such additives as thermal, oxidation and light stabilizers, lubricants, pigments dyes, fillers, flame retardants, glass and mineral fibers, reinforcing agents, plasticizers, impact modifiers, nucleating agents and the like. Such additives are added in accord with techniques well known in the art in proportions which are commonly employed. The compositions of this invention may be further useful as modifiers, and particularly as aids in preparing further blends of styrenic resins and polyamides.

The practice of this invention will be made more readily apparent by consideration of the following examples, which are provided by way of illustration and not limitation.

EXAMPLE 1-6

Preparation of Carboxylated Styrenic Resins

The carboxylated ABS resins summarized in Table I were prepared by dry blending the indicated amounts of the ABS and maleic anhydride, and the peroxide where employed, then feeding the dry blend to a Werner & Pfleiderer ZDS-K 28 mm co-rotating twin-screw extruder. The material was masticated at a barrel temperature in the range 450°-550° F. and extruded. The extrudate was chopped to form pellets of the resulting carboxylated ABS resin.

The level of carboxylic anhydride bound to the carboxylated ABS resin was determined by first dissolving or suspending the carboxylated ABS resin in methyl ethyl ketone (10 g/50 ml), then re-precipitating the resin with isopropanol. The level of carboxylic compound remaining in the reprecipitated and dried resin was determined by I.R. analysis, reported as % incorporation based on the amount of carboxylic compound originally charged. The carboxylated resins and the levels of carboxylation are summarized in Table I.

To further demonstrate the carboxylation of the ABS resin, the carboxylated ABS prepared in the above step was blended with Nylon 6 (poly-e-caprolactam) by feeding equal parts of the modified ABS and Nylon 6 to Werner and Pfleiderer ZDS-K 28 MM co-rotating twin screw extruders using a melt-temperature of approximately 500° F. The melt-mixed blend was extruded, and the cooled extrudate chopped, then injection molded to provide test specimens. The blends and the results of impact testing are summerized in Table I.

Control Examples A-C are blends of Nylon 6 with unmodified ABS, prepared in substantially the same manner.

TABLE I

| | EX. NO. | | | | | | | | |
|---|---|---|---|---|---|---|---|---|---|
| | 1 | 2 | 3 | 4 | 5 | 6 | A | B | C |
| Maleation Step: | | | | | | | | | |
| ABS I pbw | 100 | 100 | 100 | 100 | — | — | 100 | — | — |
| ABS II pbw | — | — | — | — | 100 | — | — | 100 | — |
| ABS III pbw | — | — | — | — | — | 100 | — | — | 100 |

TABLE I-continued

|  | EX. NO. | | | | | | | | |
| --- | --- | --- | --- | --- | --- | --- | --- | --- | --- |
|  | 1 | 2 | 3 | 4 | 5 | 6 | A | B | C |
| Maleic Anh pbw | 0.5 | 1.5 | 1.5 | 2.0 | 1.5 | 1.25 | — | — | — |
| Di Cup pbw | 0.5 | 0 | 0.75 | 0.5 | 0.5 | 0.1 | — | — | — |
| Lubricant pbw | — | — | — | — | — | 0.25 | — | — | — |
| % Incorp. pbw | 50 | 48 | 61 | 75 | 65 | N.D. | — | — | — |
| Blend With: Nylon 6 | 100 | 100 | 100 | 100 | 100 | 100 | 100 | 100 | 100 |
| Izod Impact | 2.6 | 6.6 | 4.4 | 4.2 | 15.5 | 5.4 | 1.3 | 2.3 | — |
| Delamination | none | none | none | none | none | none | severe | severe | severe |

Notes:
ABS I = Blendex 101 ABS resin;
ABS II = Blendex 131 ABS resin;
ABS III = Blendex 133 ABS resin, all from Borg-Warner Chemicals, Inc.
Nylon 6 Capron 8209F from Allied Chemical Corp.
Lubricant = F88 ethylene oxide - propylene oxide copolymer from BASF Wyandotte
Izod Impact = Ft lbs/in notch, at R.T., $\frac{1}{8}$" × $\frac{1}{8}$" bars, injection molded
Di Cup = Dicumyl peroxide
% Incorp. % of maleic anhydride attached to ABS; by extraction The interaction of the ethylenically unsaturated carboxylic compound and the styrenic resin, appears to result in carboxylation of the styrenic, as is demonstrated by the level of maleic anhydride incorporation for Examples 1-5. The level of incorporation appears to be somewhat unpredictable, varying with the levels of carboxylic compound and free radical generator employed as well as with the processing conditions. However, as shown by the delamination characteristics and impact properties of the blends of the modified ABS resins of with Nylon 6, Examples 1-6, the levels of incorporation that result in the process of this invention significantly improve these blends as compared with the blends of unmodified ABS and Nylon 6 shown as Control Examples A-C.

CONTROL EXAMPLE D

A Direct Blend of Polyamide, Styrenic Resin and Anhydride

A mixture of 50 pbw ABS I, 49 pbw Nylon 6, 1.0 pbw maleic anhydride and 0.25 pbw dicumyl peroxide was prepared by dry blending the components. The mixture was then fed to the compounding extruder used in Examples 1-6, melt-mixed at a barrel temperature of approximately 500° F., and extruded. The chopped pellets of cooled extrudate were injection molded to form test specimens. This direct-blend product had an izod impact of 1.2 ft lbs/in notch, demonstrating that process of this invention, wherein the styrenic resin is first carboxylated by melt-mixing the the ethylenically unsaturated carboxylic anhydride then blended with the polyamide component, is more effective than a direct processing of all components in a single step.

In the practice of the process of this invention, it may be desirable for some applications to remove the portion of the carboxylic compound that remains unattached to the styrenic resin. The presence of low molecular weight carboxylic compounds in such resins may contribute to cross-linking or otherwise deleterious interactions in blends with polyamides and the like, and may undergo undesirable side reactions with further additives such as stabilizers, antioxidants, flame retardants and the like. Removal of these low molecular weight carboxylic compounds may be conveniently accomplished by devolatizing the resin in the melt-blend step by using a vented extruder, or preferably a vacuum-vented extracted, to accomplish the compounding. Alternatively, and less preferred, the resin may be solvent-extracted, or dissolved in an appropriate solvent and reprecipitated, to remove the low molecular weight carboxylic compounds.

EXAMPLES 7-15

Further alloys of carboxylated ABS and Nylon 6 were prepared. ABS resins carboxylated with varying levels of maleic anhydride and using differing amounts of peroxide free radical generator, compounded at various temperatures, were employed. The formulations used in the carboxylation step and the properties of the resulting alloys are summarized in Table II.

TABLE II

|  | EX. NO. | | | | | | | | |
| --- | --- | --- | --- | --- | --- | --- | --- | --- | --- |
|  | 7 | 8 | 9 | 10 | 11 | 12 | 13 | 14 | 15 |
| Maleation Step: | | | | | | | | | |
| ABS I pbw | 100 | 100 | 100 | 100 | 100 | — | — | — | — |
| ABS II pbw | — | — | — | — | — | 100 | 100 | 100 | 100 |
| Maleic Anh. pbw | 1.5 | 1.5 | 1.5 | 1.5 | 1.25 | 1.25 | 1.25 | 1.25 | 1.25 |
| Di Cup pbw | 0 | 0.5 | 0 | 0.5 | 0.1 | 0 | 0.2 | 0.5 | 0.5 |
| Temperature C. | 485 | 485 | 540 | 540 | 520 | 520 | 520 | 520 | 540 |
| Blend With: Nylon 6 | 100 | 100 | 100 | 100 | 100 | 100 | 100 | 100 | 100 |
| Izod Impact, R.T. | 6.6 | 5.3 | 13.8 | 4.4 | 14.1 | 16.7 | 17.2 | 16.9 | 16.6 |
| Izod Impact, −10° C. | — | — | — | — | 1.2 | 4.5 | 4.3 | 1.7 | 1.5 |
| Tensile Yield (psi) | — | — | — | — | 7675 | 7320 | 7485 | 7213 | 7260 |
| Tensile E (%) | — | — | — | — | 235 | 213 | 207 | 210 | 235 |
| Tensile Mod. (kpsi) | — | — | — | — | 373 | 370 | 373 | 345 | 356 |

Notes:
See note to Table I

It will be apparent from the properties of the alloys of Examples 7-15, all of which exhibited little or no delamination, that variations in ABS, in peroxide level, in processing temperature and in anhydride level affect physical properties to some extent. The greater variations appear to be in impact properties. It will thus be apparent to those skilled in the art that optimization of these parameters will be needed with respect to the particular styrenic resin employed. However, within the range of conditions and compositions disclosed and taught for use in the practice of this invention, improvement in properties, particularly in compatibility as represented by reduced delamination, will be observed. It will also be seen from these examples that the inclusion of a free radical generator is optional, and may be detrimental to impact properties when used with particular styrenic resins (compare Examples 9 and 10) or at elevated levels (compare Examples 13 and 14, 10° C. impact). Including low levels of a free radical generator was also observed to improve the color of the carboxylated styrenic resin.

EXAMPLES 16-21

Further alloys of carboxylated ABS and various polyamides were prepared substantially by the processes of Examples 1-6 and tested. The properties are summarized in Table III.

TABLE III

| | EX. NO. | | | | | |
|---|---|---|---|---|---|---|
| | 16 | 17 | 18 | 19 | 20 | 21 |
| Maleation Step: | | | | | | |
| ABS II, pbw | 300 | 100 | 100 | 100 | 100 | 100 |
| Maleic Anh, pbw | 4.5 | 1.5 | 1.5 | 1.5 | 1.5 | 1.25 |
| Di Cup, pbw | 0.1 | 0.1 | 0.1 | 0.1 | 0.1 | 0.1 |
| Temperature C. | 540 | 540 | 540 | 540 | 540 | 540 |
| Blend With: | | | | | | |
| Nylon 6 | 100 | 100 | 300 | — | — | 100 |
| Nylon 6,6 | — | — | — | 100 | — | — |
| Amorph Nylon | — | — | — | — | 100 | — |
| Izod Impact, R.T. | 1.4 | 13.8 | 3.5 | * | 9.1 | 16.2 |

Notes:
See note to Table I; Nylon 6,6 obtained as Zytel 42 polyamide from DuPont Company; Amorphous nylon obtained as Zytel 330 from the DuPont Company; Nylon 6 obtained as Fosta 578 from the Foster-Grant Company.
*Test not run - extrudate was smooth.

EXAMPLE 22

A sample of ABS II was carboxylated by melt-mixing 100 pbw of the resin with 2.0 pbw maleimide and 0.1 pbw dicumyl peroxide. The extrudate resin, which showed carboxyl incorporation by I.R., was then melt-mixed with an equal weight of Nylon 6. The alloy extrudate appeared smooth. A similar alloy, prepared by first melt-mixing 100 pbw ABS II with 2.5 pbw N-phenyl maleimide to provide a product which similarly showed carboxyl incorporation by I.R., then combining the product with an equal weight of Nylon 6, also gave a smooth extrudate.

The process of this invention may thus be extended to the preparation of alloys from a variety of polyamides, using ethylenically unsaturated amide compounds as well as carboxylic anhydrides.

The invention will thus be understood to be an improved process for the preparation of polyamide-styrenic resin blends wherein a conventional, pre-formed styrenic resin is melt-mixed with an ethylenically-unsaturated carboxylic compound, then melt blended with a polyamide, as well as compositions prepared by the improved process of this invention.

What is claimed is:

1. A composition comprising from 5-95 wt% of a polyamide and correspondingly from 95-5 wt% of a carboxylated styrene polymer resin, said carboxylated styrene polymer resin being the product of melt-processing a mixture comprising 100 parts by weight of a graft polymer comprising styrene, acrylonitrile and butadiene and from 0.05 to 5 parts by weight of an ethylenically-unsaturated carboxylic compound selected from the group consisting of maleic ahydride, maleic acid, glutonic anhydride, itaconic acid, citraconic anhydride, maleimide, N-phenyl maleimide and mixtures thereof.

2. The composition of claim 1 wherein said mixture further comprises a free-radical generator.

3. The composition of claim 1 wherein said styrene polymer resin is an acrylonitrile-butadiene-styrene resin.

4. The composition of claim 1 wherein said ethylenically-unsaturated carboxylic compound is selected from the group consisting of maleic anhydride, maleimide and N-phenyl maleimide.

5. The composition of claim 1 wherein said carboxylated styrene polymer resin is the product of melt-processing a mixture comprising 100 pbw of an acrylonitrile-butiene-styrene resin and from 0.05 to 2.0 pbw of maleic anhydride.

6. The composition of claim 5 wherein said mixture further comprises a free-radical compound.

7. A method for preparing a blend comprising a polyamide and a graft polymer comprising styrene, acrylonitrile and butadiene comprising the steps of:
    (a) providing a mixture comprising 100 pbw of a graft polymer comprising styrene, acrylonitrile and butadiene and from 0.05 to 5 pbw of an ethylenically-unsaturated carboxylic compound selected from the group consisting of maleic anhydride, maleic acid, glutonic anhydride, itaconic acid, citraconic anhydride, maleimide, N-phenyl maleimide and mixtures thereof;
    (b) melt-mixing said mixture at a temperature in the range of 450°-650° F.; and
    (c) thereafter melt-mixing said mixture with a polyamide.

8. The method of claim 7 wherein said mixture further comprises a free radical generator.

9. The method of claim 7 wherein said graft polymer resin is an acrylonitrile-butadiene-styrene.

10. The method of claim 7 wherein said ethylenically-unsaturated compound is selected from the group consisting of maleic anhydride, maleimide and N-phenyl maleimide.

11. The method of claim 7 wherein said ethylenically-unsaturated compound is maleic anhydride.

* * * * *

UNITED STATES PATENT AND TRADEMARK OFFICE
CERTIFICATE OF CORRECTION

PATENT NO. : 4,740,552
DATED : April 26, 1988
INVENTOR(S) : Thomas S. Grant and David V. Howe It is certified that error appears in the above-identified patent and that said Letters Patent is hereby corrected as shown below:

Column 6, line 29, cancel "butiene" and insert -- butadiene --.

Signed and Sealed this

Thirtieth Day of August, 1988

Attest:

DONALD J. QUIGG

Attesting Officer

Commissioner of Patents and Trademarks